United States Patent [19]
Calvert

[11] Patent Number: 5,967,208
[45] Date of Patent: Oct. 19, 1999

[54] METHOD AND APPARATUS FOR ROTARY CUTTING OF WOOD VENEER

[75] Inventor: Harry B. Calvert, New Smyrna Beach, Fla.

[73] Assignee: Calvert Manufacturing, Inc., Longwood, Fla.

[21] Appl. No.: 08/833,298

[22] Filed: Apr. 4, 1997

[51] Int. Cl.[6] .............................. B27B 1/00; G05B 19/18; B23Q 15/00
[52] U.S. Cl. ..................... 144/356; 144/209.1; 144/211; 144/213; 144/365; 364/474.09
[58] Field of Search .................. 364/474.09; 82/117, 82/118; 144/209.1, 211, 212, 213, 356, 357, 365

[56] References Cited

U.S. PATENT DOCUMENTS

| | | | |
|---|---|---|---|
| 5,452,220 | 9/1995 | Ely | 144/357 |
| 5,564,253 | 10/1996 | Nakaya | 144/356 |

OTHER PUBLICATIONS

Article entitled *Forest Products Journal*, vol. 23, No. 12, pp. 28–31.
Paper (1973) entitled *Thickness Variation in Veneer Peeled with a Floating Bar*.
Text entitled *Lathe Operator's Manual*, Part 2, Pressurebars.

*Primary Examiner*—W. Donald Bray
*Attorney, Agent, or Firm*—James H. Beusse; Holland & Knight LLP

[57] ABSTRACT

An improved apparatus and method for use in the rotary cutting of wood veneer is disclosed. The improved apparatus and method are preferably employed in connection with a conventional lathe having a pressure bar. Such a lathe is of the type that is used to produce wood veneer from a workpiece of wood, such as a log. The improvement is characterized as maintaining a preselected pressure of the pressure bar against the wood, and subsequently adjusting the preselected pressure bar position by using means for doing so, thereby producing wood veneer of uniform thickness and surface quality, independent of variations in wood density and wood hardness, such variations resulting from natural growth conditions and temperature of the wood.

4 Claims, 1 Drawing Sheet

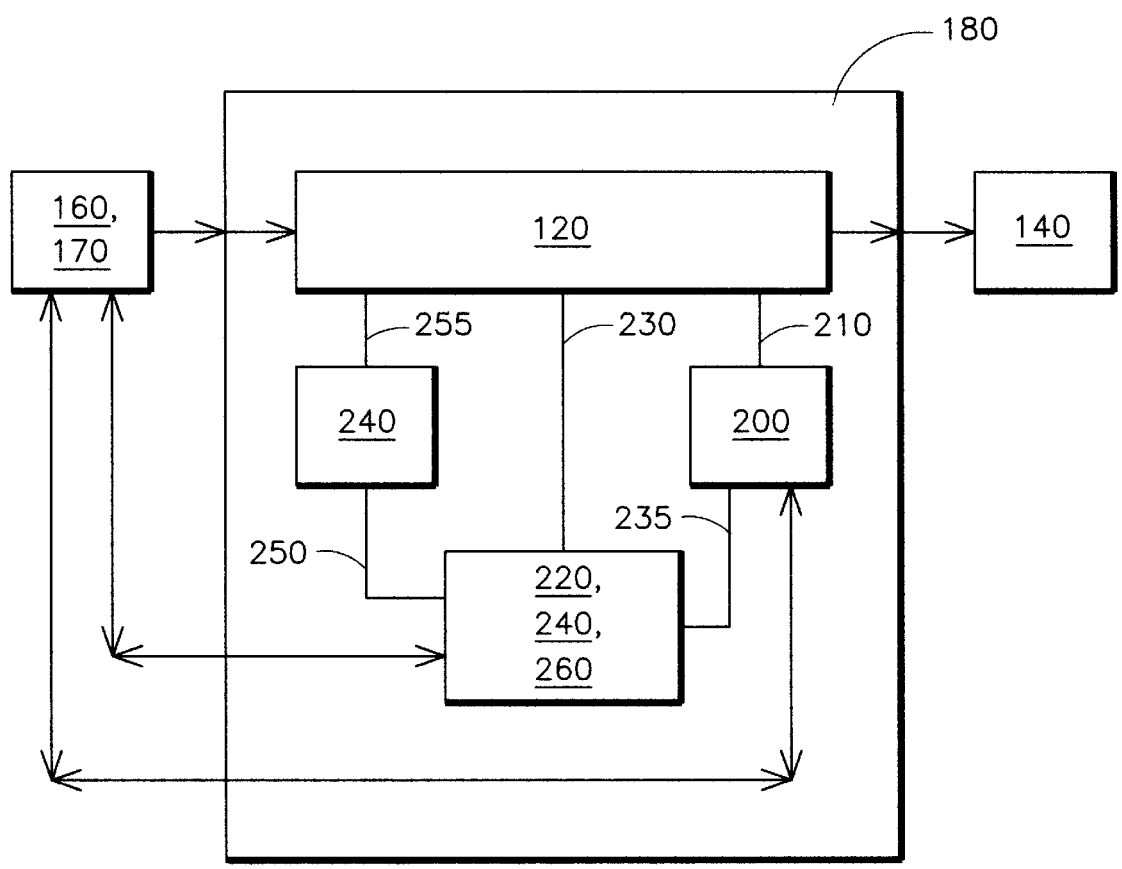

METHOD AND APPARATUS FOR ROTARY CUTTING OF WOOD VENEER

TECHNICAL FIELD OF THE INVENTION

My invention, briefly stated, is directed to an improved method and apparatus used in connection with rotary cutting machinery, such as a lathe, which can be used to produce wood veneer.

My invention, more particularly stated, is preferably used in connection with such conventional rotary cutting machinery as a lathe having a pressure bar. In such an environment, positive control of the lathe pressure bar can be achieved through use of my invention.

BACKGROUND OF THE INVENTION

Machine tools, which make an assortment of products including parts for other machines, range from hand-operated machinery capable of shaping or planing metal or wood to modern-day computer-linked systems cabable of building industrial robots.

In connection with the lathe, one of the oldest machine tools, modern improvements include improved cutting materials—such as high-speed steel, stellite, tungsten carbide, and ceramics—which have made faster cutting speeds possible. Faster cutting speeds, in turn, have been the impetus for the development of improved bearing and lubrication systems. Currently, certain lathes are designed with built-in computers programmed to perform preselected functions.

In general, a conventional lathe (or turning machine) will include a headstock portion on which is mounted a face plate, as well as a tailstock portion which is spaced from the headstock portion. An axis of rotation, defined by the headstock and tailstock portions, will be an additional aspect of a conventional lathe or turning machine. The conventional lathe or turning machine will accordingly further include means for holding and rotating a workpiece about this axis. Finally, such a lathe or turning machine will typically further include a tool, means for mounting the tool in fixed relation to the held and rotated workpiece, and means for advancing the tool toward the held and rotated workpiece.

In the normal, long-established manner of peeling wood veneer by rotary cutting, a log (the workpiece) is first selected, then next is supported on a conventional wood veneer-producing lathe in a manner so as to be rotatable about a spindle axis and, finally, is driven by spindles (called "end-dogging spindles") built into the lathe frame. Also provided is a carriage, which may be driven toward the spindle axis at any of several rates of advance per spindle turn, for purposes of achieving a uniform thickness in the veneer. A conventional wood veneer-producing lathe carriage, in this regard, is typically further equipped with a full-length cutting knife as well as with a separately-controlled pressure bar (also called nose bar).

See, for example, an article entitled "Peeling Veneer With a Floating Bar: Effect of Bar Pressure on Veneer Quality," authored by O. Feihl and M. N. Carroll, the article appearing in the December 1973 issue of *Forest Products Journal* (Vol. 23, No. 12), at pages 28–31.

The pressure bar (or nose bar) is designed to contact the wood at a point immediately above the cutting edge of the knife. To produce veneer of maximum quality, those who practice this technology conventionally manually select a fixed mechanical setting, for maintaining a preselected spacing (called "horizontal gap") from the knife, to produce veneer having a thickness which is slightly less than the desired veneer thickness, the purpose being to compress the wood slightly, resulting in a cleaner cut, which is a desirable effect.

See, for example, a paper entitled "Thickness Variation in Veneer Peeled With a Floating Bar," authored by O. Feihl and M. N. Carroll, the paper (dated 1973) presented (as Report OPX62E) at Eastern Forest Products Laboratory (800 Montreal Road, Ottawa, Canada K1A OW5).

A second purpose, or desired effect, is to provide a stabilizing pressure against the wood (also called block), and also to dampen vibration, to reduce chatter, and to minimize random movement, all of which are desired effects. Alternatively, conventionally employed is a hydraulic servo-head system (referred to herein as a hydraulic servo head), comprising a servo-connected hydraulic cylinder, which, for purposes of accomplishing the above-noted desired effects, responds to an electronic position command to maintain its desired gap setting.

In any event, a gap will initially be selected by those skilled in the art, and the initial gap value subsequently changed, to accommodate the nature and physical properties of the wood.

If all trees had a common, homogeneous compositional make-up and structure, and were of exactly the same wood type and density, the above would be a very simple and tidy solution to the manufacture of veneer products having uniform product thickness and quality.

However, all trees are not equal and, as a result, wood density characteristics will vary from one block to the next. It is generally recognized that such variations may be influenced, in a minor way, by temperature. In this regard, I believe that such variations are even more influenced by such environmental tree-growth considerations as frequency and/or periods of drought or excessive rain (and attendant annual growth-ring spacing), presence or absence of knots, frequency and degree of insect infestation, and so forth.

Gap value selection is thus affected by such wood physical characteristics as tree-growth environment and history, wood species and variety, wood temperature, and wood density.

Normal block pre-conditioning typically calls for a temperature of approximately 140° F. (about 60° C.) for the wood.

Because wood temperature is one of the more readily apparent indicators relating to wood hardness (or density), some attempts have been made, by those skilled in this particular art, to adjust pressure bar (also called "nose bar") gap, in a manner so as to relate this gap value to wood temperature. However, such variations are often made merely in arbitrary fixed increment, generally relating only to temperature, without regard for such wood physical properties as wood density. As a result, such selection criteria have not proven generally reliable on production scale, resulting in the abandonment of such selection criteria in many cases.

OBJECTS OF THE INVENTION

Thus, one object of my present invention is to manufacture an apparatus which is capable of applying a constant pressure against the wood, rather than operating under the constant-gap principle, resulting in the production of better-quality wood veneer.

A related object is that wood veneer, thus produced, will have more uniform thickness as well as improved surface quality properties.

A further object is that such an apparatus will be able to produce desired quality wood veneer at conventional production peel rates, with minimal tendency toward bounce or chatter, both undesirable.

Additional objects will become readily apparent to those skilled in the art, upon reference to this disclosure.

SUMMARY OF THE INVENTION

In accordance with the foregoing objects, my present invention may now be summarized as follows.

The invention, which is preferably used in connection with rotary cutting machinery for producing wood veneer from a workpiece of wood such as a log, reduced to its essential elements (or components) is, simply stated, an improved apparatus (or system) including pressure bar means, operatively connected to the rotary cutting machinery, for providing a preselected quantity of compression to the workpiece. In this regard, the essential elements or components which provide the improvement to this apparatus comprise pressure bar adjustment means, operatively connected to the rotary cutting machinery and the pressure bar means, for adjusting the position of the pressure bar means relative to the workpiece; and pressure transducer means able to generate information in response to sensed force due to wood density changes, the pressure transducer means being operatively connected to the pressure bar adjustment means and the rotary cutting machinery, for generating information in response to the quantity of force being sensed by the pressure bar means against the workpiece.

Preferably, the pressure bar adjustment means is a conventional hydraulic servo head means, such as a commercially available servo head system, operatively connected to the rotary cutting machinery.

My improved method, accordingly, may thus be characterized, very briefly, as using the pressure bar adjustment means to adjust the position of the pressure bar means relative to the workpiece.

The foregoing, as well as other objects, features and advantages of my invention will become more readily understood upon reference to the detailed description and accompanying drawing figure.

BRIEF DESCRIPTION OF THE DRAWING

The accompanying FIGURE is a block diagram presenting essential components of the improved apparatus of my invention.

DETAILED DESCRIPTION OF THE PREFERRED EMBODIMENT

As was briefly mentioned above, my present invention is preferably used in connection with commercially available rotary cutting machinery, able to produce wood veneer from a workpiece of wood such as a log.

Thus, reduced to its essential elements (or components), one aspect of my present invention is directed to an improved apparatus, or system, which includes pressure bar means, operatively connected to the rotary cutting machinery, for providing a preselected amount or degree of compression to the workpiece.

In such an environment, my improvement may be characterized as comprising pressure bar adjustment means, carried by the rotary cutting machinery, for adjusting the position of the pressure bar means relative to the workpiece; and pressure transducer means able to generate information in response to sensed force due to the change of wood density, the pressure transducer means being operatively connected to the pressure bar adjustment means, for generating information in response to the amount of force being sensed by the pressure bar means against the workpiece.

For example, when producing Red Oak veneer of 0.030 inches (about 0.762 millimeters) thickness, I have found a desirable pressure against such wood to be in the order of approximately 40 pounds per lineal inch.

To achieve such a result, the pressure bar adjustment means is preferably commercially available hydraulic servo head means, operatively connected to the rotary cutting machinery.

Accordingly, another aspect of my invention is directed to an improved method of using pressure bar adjustment means to adjust the position of the pressure bar means relative to a workpiece. More particularly, another aspect or feature of my invention is directed to a method for producing wood veneer from a workpiece of wood.

Such a method is used in connection with an apparatus (such as my improved apparatus, summarized above) which includes rotary cutting machinery; and pressure bar means, operatively connected to the rotary cutting machinery, for providing a preselected quantity of compression to the workpiece. In such an environment, the essential step of my improved method comprises using pressure bar adjustment means, operatively connected to the rotary cutting machinery and the pressure bar means, to adjust the position of the pressure bar means relative to the workpiece. additional step may include using pressure transducer means, able to generate information in response to sensed force, to generate information in response to the quantity of force being sense by the pressure bar means against the workpiece.

Detailed Description of FIGURE

As was briefly mentioned above, the accompanying FIGURE is a block diagram presenting essential elements or components of the improved apparatus of my present invention.

My invention, preferably used in connection with rotary cutting machinery 120 for producing wood veneer 140 from a workpiece 160 of wood such as a log 170, thus reduced to its essential elements or components is, simply stated, an improved apparatus 180 (or system) including pressure bar means 200, operatively connected via a connection 210 to the rotary cutting machinery 120, for providing a preselected quantity of compression to the workpiece 160. In this regard, the essential elements or components which provide the improvement to this apparatus comprise pressure bar adjustment means 220, operatively connected via a connection 230 to the rotary cutting machinery 120 and via a connection 235 to the pressure bar means 200, for adjusting the position of the pressure bar means 200 relative to the workpiece 160; and pressure transducer means 240 able to generate information in response to sensed force, the pressure transducer means 240 being operatively connected via a connection 250 to the pressure bar adjustment means 220 and via a connection 255 to the rotary cutting machinery 120, for generating information in response to the quantity of force being sensed by the pressure bar means 200 against the workpiece 160. Preferably, the pressure bar adjustment means 220 is hydraulic servo head means 240, such as a commercially available servo head system 260, operatively connected via connection 230 to the rotary cutting machinery 120.

Best Mode

Following the mandate of 35 United States Code, Section 112, the best mode of my invention is detailedly described as follows.

Servo Head Float System

One aspect of my present invention, which I characterize as a "float" principle, may be viewed as an add-on feature to a conventional servo head system. The purpose served by my "float" principle is to make the pressure bar position control sensitive to a preselected level of thrust against the log chosen, rather than to hold a preselected gap dimension. Data for this particular control aspect or feature of my invention, for use in connection with a commercially available servo head position control system, are gathered from a pressure transducer mounted in the blank end of a commercially available servo cylinder.

Preferably, such data are processed and presented in digital form to the conventional servo head position control system.

It is anticipated, when in use, that an operator will have data input means for establishing a desired level of thrust to be maintained against the wood. In this sense, such thrust data may conveniently be presented as a specified quantity of pounds per lineal inch of contact.

The above aspects of my "float" principle also take into account the many variables in density from one log to the next, enabling the lathe to work with a constant degree of compression in the wood rather than being required to force material of varying hardness or density through a rigidly fixed dimension of gap.

In this sort of situation, the conventional servo head control system (which includes position control) is considered as the host facility and will receive, process and output much of the command data to an applicable branch of the position control.

Yet it is recognized that certain periods of lathe operation, such as new knife break-in, may not be compatible with my "float action" principle herein described. Accordingly, a means of enabling float action, via minimal experimentation, such experimentation being known to those skilled in the art, can readily be provided by those skilled in the art to assist the operator in this regard.

When the best level of thrust against the log is determined from experience, the operator's input means may then be used to establish a "fine-line" window at the desired level of thrust. At any time during the peeling action, if the thrust level drops below that window, the system will input small digital increments until the desired level is reached.

It is expected that some damping will be desirable in this action to prevent response to momentary pressure changes from gaps in the continuous peel and, also, to discourage excessive "hunting" about the preselected "fine-line" thrust level.

Pressure Acting Against The Bar

It is generally known that conventional pressure bar assemblies must be sturdily built because of the relatively high pressures which must be applied by a typical pressure bar assembly against a workpiece. Yet another consideration may be the speed of operation between the pressure bar assembly and workpiece.

For example, Palka (1974) recorded loads of 90 to 120 pounds per lineal inch (about 16 to 21 kilograms/centimeter) of roller nosebar (one type of pressure bar assembly) when peeling Douglas fir from $\frac{1}{10}$-inch to $\frac{1}{8}$-inch (2.54 millimeters to 3.18 millimeters) thick. Feihl and Carroll (1973) recorded pressures as high as 90 pounds per lineal inch (16 kg/cm) when peeling with a specially mounted floating head for flat pressure bar (another type of pressure bar assembly). Use of special apparatus, in the early 1970s, reduced the pressure required, to achieve desired results, to a range of 50 to 60 pounds per lineal inch of bar (8.9 to 10.7 kg/cm) for softwoods and to 30 to 40 pounds per lineal inch (5.4 to 7.2 kg/cm) for hardwoods. These figures were independent of thickness or species. Thus, even the reduced settings indicate that the total load on a bar (considering overall bar length) amounts to thousands of pounds. (From: *Lathe Operator's Manual*, Part 2, Pressurebars: Their Operation And Manufacture.)

Pressure Bar Servo Actuator System

A preferred conventional servo head system (commercially available from Calvert Manufacturing, Inc., 245 North Street, Longwood Florida 32750, U.S.A.; telephone number 407-331-5522; FAX number 407-331-0089) shall now briefly be described.

In such a conventional servo head system, the differential pressure of a pressure bar servo actuator cylinder is measured by means of a pressure transducer. The pressure transducer transmits an analog signal proportional to the differential pressure seen (i.e. sensed) by the pressure transducer to a conventional analog input module. The measurement is displayed, in pounds per lineal inch of bar pressure, on a conventional panel screen, using conventional electronic equipment.

Such electronic equipment includes a conventional word processor that is able to read, in DOS format, electronic information which is contained on a conventional disc in TEXT format.

Float Testing

In connection with a commercially available resistance ram (which includes hydraulic cylinders), the resistance ram being capable of simulating wood compression forces on a commercially available nose bar, if desired nose bar pressure is 40 pounds per lineal inch, accounting for length of such conventional nose bar and number of cylinders used, then the total force required may be 2200 pounds per cylinder; and the blank end area may be 28.27 inches (about 71.8 cm), given that the blank end bore diameter is 6 inches (15.24 cm). In this regard, 77.82 pounds per square inch ("psi") pressure is required to achieve 40 pounds per lineal inch on the pressure bar.

Test One

This test is performed in conjunction with a commercially available lathe station. Such lathe station has been provided with a conventional enclosure which includes a viewing panel having a dial indicator as well as a "Float—Enable/Disable" selector switch. Also, "float" positional limits are set via commercially available software. Such software is operatively connectable to a conventional servo actuator as well as to a conventional resistance ram.

First step, then, is to set one servo actuator having a rod as well as one resistance ram, also having a rod, onto a mechanically rigid base. In this regard, the actuator and ram are arranged such that rod centerlines are aligned on a common axis. Also, the actuator and ram are spaced such the smaller stroke (e.g. about 2 inches, about 5.1 cm) of the resistance ram is fully utilized by the larger stroke (e.g. about 3 inches, about 7.6 cm) of the servo actuator.

Next step, in conjunction with a commercially available electronic control system, is to plumb the hydraulic power unit to the servo actuator, a differential pressure transducer already having been installed on the servo actuator. Then turn on the electronic system; and insure that the actuator responds to positional inputs (e.g. setpoints).

Next step, is to plumb the blank end of the resistance ram to a commercially available hand pump. Such a hand pump preferably includes a conventional pressure gauge, and may further include a conventional bleed-off valve as well as a conventional check valve.

Next, electronically position the servo actuator rod to within 1 inch of the end of the rod of the resistance ram, when the resistance ram is manually retracted.

Then, fill and bleed the resistance ram by extending the ram until all air is purged, the resistance ram abutting the static servo actuator rod, with no mushiness/sponginess being present in the resistance ram.

Next, release all pressure from the resistance ram's blank end.

Then, place an indicator on the actuator rod position.

Next, enable "Float" using the "Float-Enable/Disable" selector switch located in the lathe station enclosure.

Then, monitor the indicator to detect the amount as well as the direction of movement, while observing pressure rise on the blank end of the pressure ram's pressure gauge. The servo actuator should extend (up to the software set limits, if necessary); and the pressure should rise to the appropriate figure dependant upon the desired nose bar pressure that has been selected with the viewing inputs of the panel. The viewing panel should display the actual bar pressure that is seen by the differential pressure transducer. For example: if the 40 pounds per lineal inch value is selected and displayed, the pressure gauge should display 77 psi; if 60 pounds per lineal inch is selected and displayed, the pressure gauge should display 116 psi; and so on. If the software setable "float" positional limits are set too tight, the servo actuator may stop extending when the set limit is hit. This would possibly show up as an inability to build the resistance ram's blank end pressure up to the desired value. Thus, one may deem it necessary initially to set the "window" values suitably high enough, in view of these considerations, to allow float "in" or "out," to attain desired back pressure, disregarding the "100% peel thickness retract limit" and "75% peel thickness extend limit" values.

The final step, then, is to alter (i.e., alternatively raise and lower) the pressure with the hand pump, and bleed off while monitoring the resistance ram's blank end pressure as well as the amount and direction of linear travel of the servo actuator rod.

Test Two

Using one of the above-described conventional servo actuators that has already been checked out, employing servo head logic shake down procedures well known to those skilled in the art, operatively connect the servo actuator in conventional master/slave relationship, enslaving the servo actuator to the "float test" servo actuator. Repeat the high and low pressure test, alternatively, using the hand pump on the "float test" resistance ram. The enslaved cylinder should react in parallel to the "float test" servo actuator in direction and amplitude.

Note: At this time it is generally thought prudent practice to document various parameters, such as rod extension, rod extension direction, pressure gauge reading of resistance ram's blank end pressure (nose bar), relating these parameters, accordingly, to the differential pressure transducer voltage output.

Test Three

This test is for determining response times and resonance.

First, inject adjustable air pressure to the base end of the resistance ram.

Next, disconnect the differential pressure transducer from the processor and substitute a generated analog signal equivalent to the transducer analog output found in "test two." Fluctuate this signal over a range of frequencies, while remaining within amplitude limits which corresponds to a preselected "window" of suitable compression variations.

The final steps of this test, which are to determine relative amount of physical movement on the servo piston which correspond to the voltage limits, include using the dial indicator to determine these values in a slow cycle, and introducing oscillating voltage at gradual increasing frequencies until a lag is observed in the dial indicator display.

Test Four

Repeat "test three" in the manner described above, particularly with respect to "test two," by enslaving a second commercially available actuator to the primary "float test" servo actuator. Repeat "test three," final steps, checking that the slave cylinder is reacting in parallel to the "test" servo actuator.

The Invention in Operation

My invention thus enables a pressure compensated horizontal bar gap control system to achieve consistent lathe head nosebar pressure while peeling wood of changing densities.

In operation, to change thickness quickly and accurately within the same log, the operating system was operated so as to progress through "at roundup" gap. Then, with momentary pause measured in milliseconds to accommodate a simultaneous change in horizontal gap and carriage feed rate, the operating system was operated so as to proceed to a preselected T2 value for Cambium wood. If desired, the operating system could have been operated further so as to proceed to a suitable marketing thickness (T3) for heartwood to the core. (It was.)

In this particular embodiment of my present invention, movement of the head was accomplished by two oversized hydraulic cylinders -servo controlled with suitable commercially available crosslinking such that identical movement of the two sides was assured at all times.

I have found that such an arrangement renders unnecessary such conventional components as a remote pressure control drive and associated shafting, various worm gears, certain pressure adjusting screws and nuts, a so-called "Quick Opening" gear and its associated air cylinder, about 48 conventional lathe parts in total.

Thus in operation, typically in hardwood production, the gap is adjusted (for T0) so as to be ¼ inches (6.35 millimeters) for roundup. My novel FLOAT feature (pressure compensated gap) remains disabled as the knife progresses through pre-roundup, with the gap remaining fixed. Responding to the "roundup complete" signal output (of the conventional system mentioned above), the gap will then close to T1 which is my preselected nominal gap for peeling Cambium level veneer. With T2 my FLOAT feature is enabled, and following a slight hesitation to allow the Carriage Drive feature (of the conventional system mentioned above) to shift to the new feed rate, immediately responds to changes in nosebar pressure forces, keeping the new gap at an exact dimension to maintain the preset pressure. Encountering density variables averaged out over the length of the log caused by hot, cold, tree growth history or nosebar geometry, the lathe will continue to peel veneer under constant conditions of nosebar stabilizing pressures.

As the peel progresses into heartwood, pressures will usually increase due to hardness and reduced moisture content of the wood.

The lathe operator then has an option to switch to T2 at the touch of a button. The gap window will immediately change to a preselected thicker veneer dimension. Concurrently, a switch of Carriage Drive will be made to the new thickness rate.

During the peel operation, the operator has several options which may be applied "on the fly" while continuing the peel. He may manipulate the pressure window as conditions dictate that he run with more or less nosebar presssure, using the keypad to select new values of nominal nosebar pressure. The upper and lower limit values will follow along with such a selection. The operator may also "skew" the carriage slightly, varying the gap at one end to the other, calling for pressure changes at the dog and tail ends of the block, as evidenced by a slight hooking of the ribbon.

Whatever judgement manipulations are punched into the program during the peel of a particular log, all offsets are cancelled at core limit and the original setup adjustments will reappear when the system is enabled for the next block.

Summarizing, veneer production under my FLOAT operating system is certainly a novel operating procedure. First, in relation to the rigidity of carriage movement, the cylinder driven head moves very rapidly and accurately from wide open 3 inch (76.2 millimeter) gap to roundup gap preadjusted to approximately ¼ inches (6.35 millimeters) then to the preset scales of T2 and T3, if desired. Maintenance work on the machine is exceedingly simplified with easy access brought on by the removal of remote pressure adjustment, eccentric and Quick Adjustment, as well as gap step and temperature related gearing.

Furthermore, knife honing (and slab removal) is greatly enhanced by a "full open" gap of 3 inches (76.2 mm). Electrical maintenance and troubleshooting routines also are enhanced by built-in diagnostric circuity backed up with an extremely well prepared Operating Manual.

Logs come along at every conceivable density level in every day production. Whether the density of wood passing through the gap is effected by high temperature, cold temperature, natural tree growth hardness or irregular growth which is thought to produce soft open rings on one side and dense hard rings on the other side, the conventional problem remains the same. Conventionally, one is not able to produce a consistently high quality of veneer by forcing each of these widely varying consistencies of wood all down through the same fixed and unyielding gap between the knife and nosebar of a conventional system. My invention solves this problem.

Equivalents

What has been illustrated and described herein is an improved apparatus and method for producing wood veneer from a workpiece of wood such as a log. While my invention has been illustrated and described with reference to my preferred embodiment, it is to be understood that my invention is not to be limited in its scope only to such an embodiment. On the contrary, it is genuinely believed that a wide assortment of mechanical and functional equivalents are certain to become apparent to those skilled in the art upon reference to my foregoing description and disclosure. Accordingly, all such mechanical, electromechanical, and otherwise functional equivalents of my present invention are to be considered as forming a part of my invention insofar as they fall within the spirit and scope of the accompanying claims.

What is claimed as invention is as follows:

1. An apparatus for use in connection with rotary cutting machinery for producing wood veneer from a workpiece of wood, including:

pressure bar means, operatively connected to the rotary cutting machinery, for exerting a compressive force on the workpiece;

pressure transducer means, operatively connected to the pressure bar means and to the rotary cutting machinery, for sensing the compressive force being applied by the pressure bar means to the workpiece;

pressure bar adjustment means, operatively connected to the rotary cutting machinery and to the pressure bar means, for comparing the compressive force sensed by the pressure transducer means to a preselected range of pressure, and adjusting the position of the pressure bar means relative to the workpiece so that the compressive force is maintained within the preselected range.

2. The apparatus of claim 1 wherein the pressure bar adjustment means is an hydraulic servo head means.

3. A method for producing wood veneer from a workpiece of wood, using a rotary cutting machine having a pressure bar means, operatively connected to the rotary cutting machine, for exerting a compressive force on the workpiece and wherein the pressure bar is adjustable with respect to the workpiece, the method comprising the steps of:

sensing the compressive force being applied by the pressure bar means to the workpiece;

comparing the sensed compressive force to a preselected range of pressure; and adjusting the position of the pressure bar means relative to the workpiece so that the compressive force is maintained within the preselected range.

4. The apparatus of claim 3 wherein the pressure bar adjustment means is an hydraulic servo head means.

* * * * *